United States Patent
Liu et al.

(10) Patent No.: US 10,440,280 B2
(45) Date of Patent: Oct. 8, 2019

(54) OPTICAL SYSTEM AND METHOD FOR OPERATING THE SAME

(71) Applicant: Advanced Semiconductor Engineering, Inc., Kaohsiung (TW)

(72) Inventors: Tien-Chia Liu, Kaohsiung (TW); Nien Chu Wang, Kaohsiung (TW); Ping-Yen Kuo, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 96 days.

(21) Appl. No.: 15/711,927

(22) Filed: Sep. 21, 2017

(65) Prior Publication Data
US 2019/0089904 A1 Mar. 21, 2019

(51) Int. Cl.
| H04N 5/232 | (2006.01) |
| G06T 7/70 | (2017.01) |
| G03B 3/10 | (2006.01) |
| G03B 13/36 | (2006.01) |
| G02B 15/14 | (2006.01) |
| G03B 41/00 | (2006.01) |
| G01S 3/786 | (2006.01) |
| H04N 5/262 | (2006.01) |

(52) U.S. Cl.
CPC ....... *H04N 5/23296* (2013.01); *G01S 3/7864* (2013.01); *G02B 15/14* (2013.01); *G03B 3/10* (2013.01); *G03B 13/36* (2013.01); *G03B 41/00* (2013.01); *G06T 7/70* (2017.01); *H04N 5/232* (2013.01); *G03B 2205/0092* (2013.01); *H04N 5/2628* (2013.01)

(58) Field of Classification Search
CPC .. H04N 5/23296; H04N 5/2628; G02B 15/14; G03B 13/36; G03B 3/10; G06T 7/70
See application file for complete search history.

(56) References Cited

U.S. PATENT DOCUMENTS

| 5,434,621 A | 7/1995 | Yu | |
| 2001/0055063 A1* | 12/2001 | Nagai | G01S 5/16 348/116 |
| 2011/0128385 A1* | 6/2011 | Bedros | H04N 5/232 348/164 |
| 2011/0243538 A1* | 10/2011 | Morimoto | H04N 5/23219 396/77 |
| 2012/0038796 A1* | 2/2012 | Posa | H04N 5/23296 348/240.2 |
| 2012/0212696 A1 | 8/2012 | Trajkovska et al. | |
| 2016/0042622 A1* | 2/2016 | Takiguchi | G01S 17/42 348/143 |
| 2016/0350921 A1* | 12/2016 | Bataller | G06T 7/80 |

* cited by examiner

*Primary Examiner* — Gevell V Selby
(74) *Attorney, Agent, or Firm* — Foley & Lardner LLP; Cliff Z. Liu (57) ABSTRACT

A system includes: (1) a sensor module configured to detect an object at a predetermined distance and obtain position information of the object relative to the sensor module; (2) a zooming module configured to move at an angle and capture an image of the object; and (3) a controller connected to the sensor module and the zooming module. The controller is configured to derive the angle in accordance with the predetermined distance and the position information of the object, and the controller is configured to control the zooming module to move in accordance with the angle.

18 Claims, 7 Drawing Sheets

OPTICAL SYSTEM AND METHOD FOR OPERATING THE SAME

BACKGROUND

1. Technical Field

The present disclosure relates to an optical system and a method for operating the same.

2. Description of the Related Art

In a comparative image-viewing system, there are challenges to clearly identify an object at a relatively far distance, especially when the object is too small to be viewed or the object appears around an edge of a screen. The object around the screen edge is not readily detected or identified because a view of the object is restricted and distorted.

SUMMARY

In accordance with some embodiments of the present disclosure, a system includes: (a) a sensor module configured to detect an object at a predetermined distance and obtain position information of the object relative to the sensor module; (b) a zooming module configured to move at an angle and capture an image of the object; and (c) a controller connected to the sensor module and the zooming module. The controller is configured to derive the angle in accordance with the predetermined distance and the position information of the object, and the controller is configured to control the zooming module to move in accordance with the angle.

In accordance with some embodiments of the present disclosure, a system includes: (a) a distance detector configured to detect a presence of an object at a predetermined distance relative to the system and generate a signal responsive to detecting the presence the object; (b) an identification module configured to receive the signal and obtain a position of the object relative to the system; and (c) an zooming module including a lens, the zooming module configured to adjust a position of the lens according to the position of the object.

In accordance with some embodiments of the present disclosure, a method of controlling an image-viewing system includes: (a) detecting that an object is located at a predetermined distance; (b) obtaining information corresponding to a position of the object responsive to detecting the object; (c) determining an angle according to the position of the object and the predetermined distance; (d) rotating a lens of the system at the angle to capture an image of the object; and (e) obtaining a viewed size of the object from the image.

BRIEF DESCRIPTION OF THE DRAWINGS

Aspects of the present disclosure are best understood from the following detailed description when read with the accompanying drawings. It is noted that various features may not be drawn to scale, and the dimensions of the various features may be arbitrarily increased or reduced for clarity of discussion.

Common reference numerals are used throughout the drawings and the detailed description to indicate the same or similar components. The present disclosure will be more apparent from the following detailed description taken in conjunction with the accompanying drawings.

DETAILED DESCRIPTION

Various embodiments of the present disclosure are discussed in detail below. It should be appreciated, however, that the embodiments set forth many applicable concepts that can be embodied in a wide variety of specific contexts. It is to be understood that the following disclosure provides many different embodiments or examples of implementing different features of various embodiments. Specific examples of components and arrangements are described below for purposes of discussion. These are, of course, merely examples and are not intended to be limiting.

Embodiments, or examples, illustrated in the drawings are disclosed below using specific language. It will nevertheless be understood that the embodiments and examples are not intended to be limiting. Any alterations and modifications of the disclosed embodiments, and any further applications of the principles disclosed in this document, as would normally occur to one of ordinary skill in the pertinent art, fall within the scope of this disclosure.

In addition, the present disclosure may repeat reference numerals and/or letters in the various examples. This repetition is for the purpose of simplicity and clarity and does not in itself dictate a relationship between the various embodiments and/or configurations discussed.

Figure 1A:
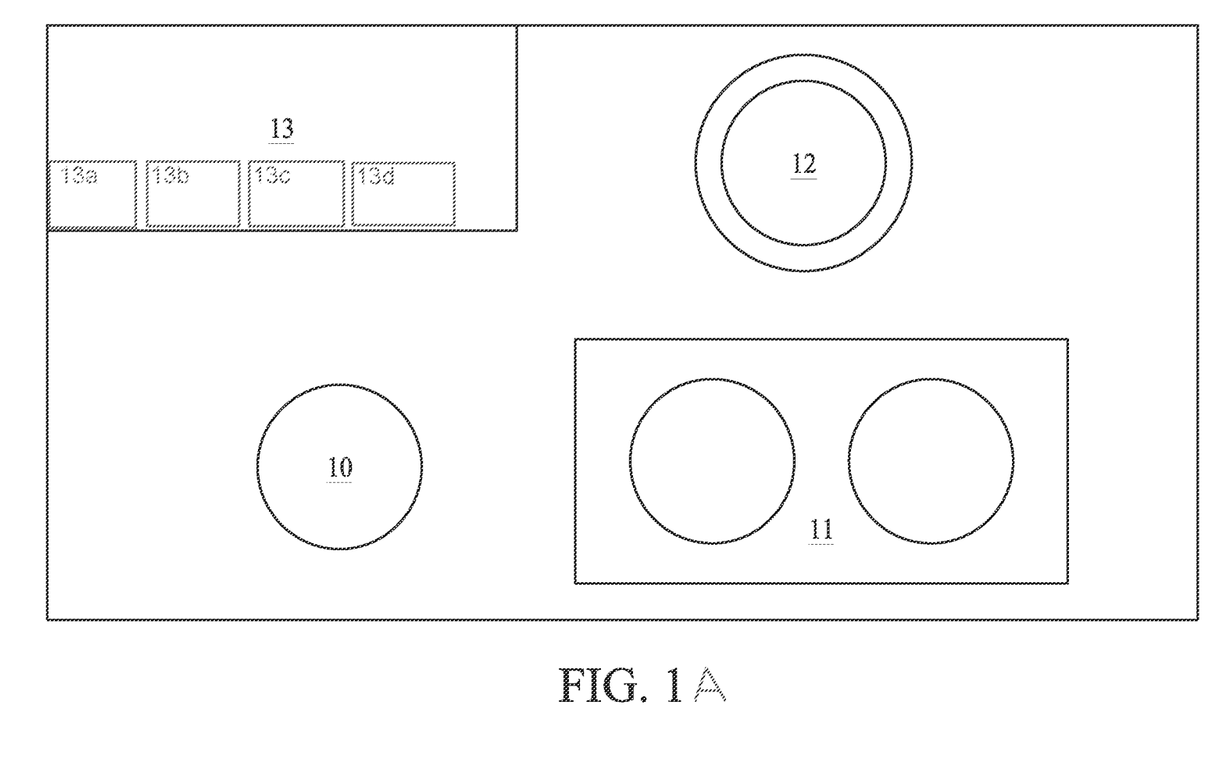
FIG. 1A illustrates a block diagram of an optical system in accordance with some embodiments of the present disclosure.

FIG. 1A illustrates a block diagram of an optical system 1 in accordance with some embodiments of the present disclosure. The optical system 1 (also simply referred to as an "image-viewing system" or a "system") includes a distance detector 10, an identification module 11, a zooming module 12 and a controller 13. In some embodiments, the distance detector 10 and the identification module 11 together can constitute a sensor module of the optical system 1.

The distance detector 10 is configured to detect an object located at a predetermined distance or within a predetermined range of distances. For example, the distance detector 10 can detect whether the object is at a predetermined distance from the distance detector 10, such as about 1 meter (m), about 2 m, about 5 m, about 10 m, about 20 m, about 30 m, about 40 m or another distance. For example, the distance detector 10 can detect whether the object is within a predetermined range of distances from the distance detector 10, such as about 1 m to about 2 m, about 1 m to about 5 m, about 1 m to about 10 m, about 2 m to about 5 m, about 2 m to about 10 m, about 5 m to about 10 m, about 10 m to about 20 m, about 10 m to about 30 m, about 10 m to about 40 m, about 20 m to about 30 m, about 20 m to about 40 m, about 30 m to about 40 m or another range. In some embodiments, the distance detector 10 is implemented in hardware using circuitry. In some embodiments, the distance detector 10 is a radar detector (e.g., one or more antennas to transmit and receive radio waves, a transmitter, and a receiver), a sonar detector (e.g., a transmitter and a receiver (or a transceiver) to transmit and receive sound waves), a depth sensor or any other suitable device.

The identification module 11 is configured to capture an image of the object and/or to obtain image information (such as position, distance, viewing angle and the like of the object relative to the identification module 11) corresponding to the object. For example, if the object is detected by the distance detector 10, the distance detector 10 is configured to generate a signal which is conveyed to the identification module 11, and the identification module 11 is triggered by the signal to capture an image of the object and/or to obtain image information corresponding to the object. In some embodiments, the identification module 11 includes a dual camera module, a three-dimensional image sensing camera to capture three-dimensional image data, or an image sensor and a lens.

The controller 13 is configured to process the image information obtained by the identification module 11 corresponding to the object and to control the distance detector 10, the identification module 11 and/or the zooming module 12. For example, the controller 13 is configured to control a rotating angle of the zooming module 12 and/or a zoom ratio of the zooming module 12. In some embodiments, the controller 13 may be a field programmable gate array (FPGA), a central processing unit (CPU) or a microcontroller unit (MCU) that includes a processor 13*a*, a memory 13*b* storing instructions executable by the processor 13*a* (e.g., a random-access memory (RAM), a read-only memory (ROM), or both), a clock 13*c*, and/or an input/output (I/O) control unit 13*d*. The controller 13 may include configurable blocks of analog and/or digital logics as well as programmable interconnects.

Figure 1B:
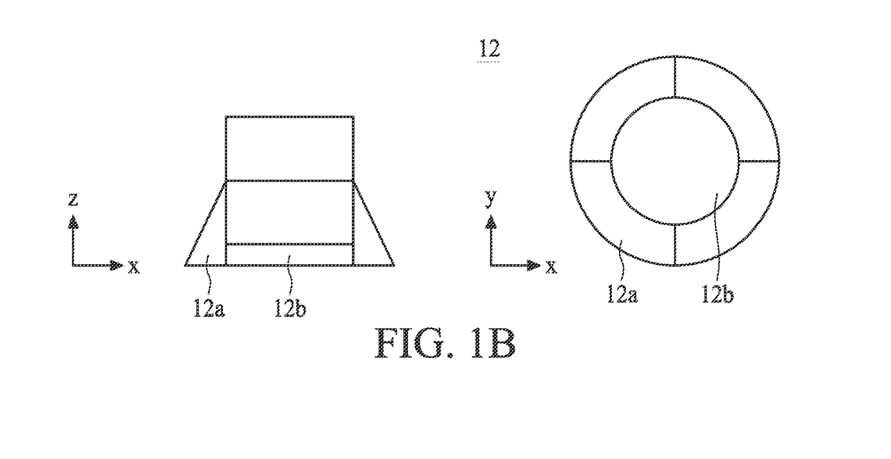
FIG. 1B illustrates a cross-sectional view and a top view of a zooming module in accordance with some embodiments of the present disclosure.
Figure 1C:
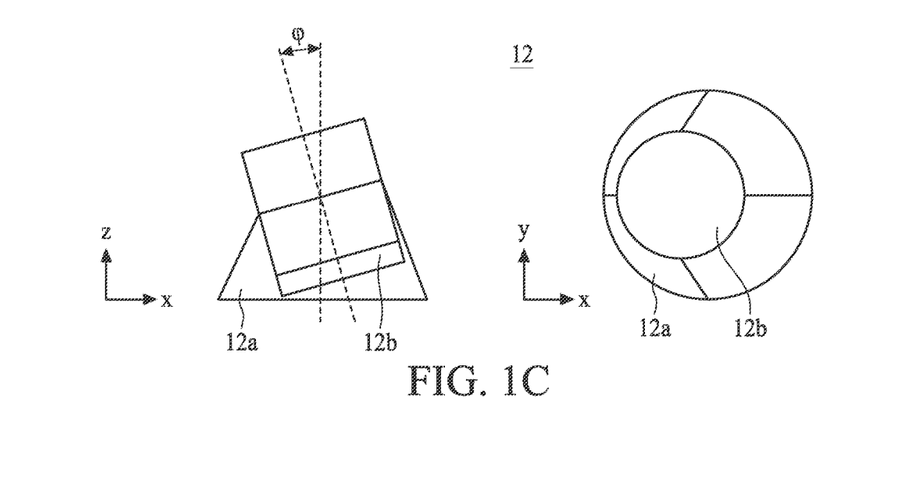
FIG. 1C illustrates a cross-sectional view and a top view of a zooming module in accordance with some embodiments of the present disclosure.

The zooming module 12 is configured to receive a signal generated by the controller 13 to move at an angle and to capture an image of the object. In some embodiments, as shown in FIG. 1B and FIG. 1C (FIG. 1B illustrates a cross-sectional view and a top view of the zooming module 12 before rotation, and FIG. 1C illustrates a cross-sectional view and a top view of the zooming module 12 after rotation), the zooming module 12 includes a rotation mechanism 12*a* and a zoom lens 12*b*. The rotation mechanism 12*a* is configured to rotate the zoom lens 12*b* at an angle $\varphi$ according to the signal corresponding to the object's image information received from the controller 13. In some embodiments, the rotation mechanism 12*a* includes a motor or another actuator to rotate the zoom lens 12*b*.

Figure 2:
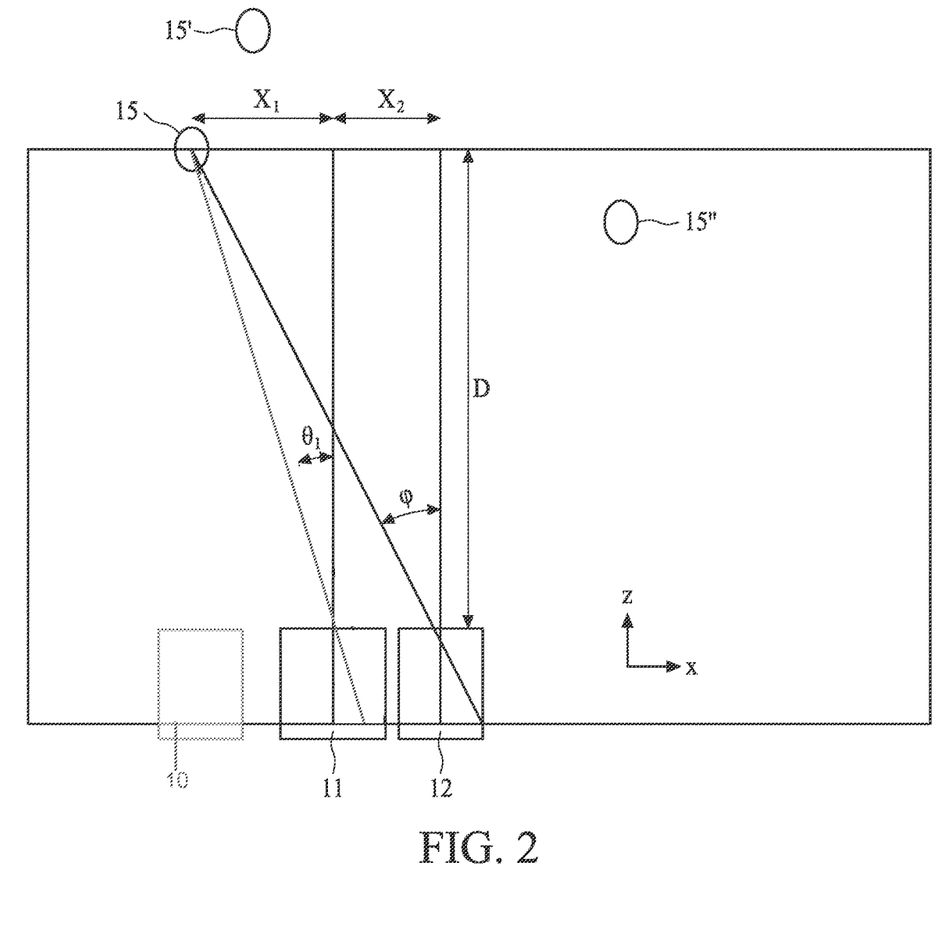
FIG. 2 illustrates a method for operating an optical system in accordance with some embodiments of the present disclosure.

In some embodiments, as shown in FIG. 2, the angle $\varphi$ is determined or derived by the controller 13 in accordance with a predetermined distance D, a distance $x_1$ between an object 15 and a projection image of the identification module 11 at the predetermined distance (or the distance between the object 15 and a central line or axis of the projection image of the identification module 11 at the predetermined distance) and a distance $x_2$ between the identification module 11 and the zooming module 12 (or the distance between the central line of the identification module 11 and a central line or axis of the zooming module 12). In particular, the angle $\varphi$ is calculated from the following equation:

$$\varphi = \tan^{-1} \frac{x_1 + x_2}{D}$$

In some embodiments, the distance $x_1$ can be derived from the following equation, wherein $\theta_1$ is an angle specified by the central line of the identification module 11 and a line connecting the object 15 and the identification module 11:

$$x_1 = D \times \tan \theta_1$$

In some embodiments, the angle $\theta_1$ can be derived according to a displacement of an image of the object 15 relative to a central line or axis of a sensing area or a screen of the identification module 11. In some embodiments, the predetermined distance D can be an approximation of an actual distance between the projection image of the identification module 11 and the identification module 11.

In some embodiments, the zoom lens 12*b* is configured to zoom in or zoom out at a zoom ratio according to the signal received from the controller 13. For example, the zooming module 12 further includes an image sensor including a sensing area or a screen. The zoom lens 12*b* is configured to zoom in the image of the object 15 if a proportion of the viewed size of the image of the object 15 on the sensing area or the screen to the sensing area or the screen is less than a predetermined value (such as about 30%, about 40%, about 50%, about 60% or another proportion). The zoom lens 12*b* is configured to zoom out the image of the object 15 if the viewed size of the image of the object 15 on the sensing area or the screen exceeds the sensing area or the screen. In some embodiments, after the viewed size of the object 15 on the sensing area or the screen reaches the predetermined value, an auto focusing operation is carried out to clearly and accurately identify the image of the object 15.

Referring to FIG. 2, additional objects 15' and 15" are disposed outside of (e.g., further away than) the predetermined distance D, and hence are omitted from the processing operations discussed above in connection with the object 15.

In accordance with some embodiments of the present disclosure, by auto focusing and/or auto zooming to adjust a suitable viewed size of an object on a screen, an image of the object can be clearly and accurately identified even if the object is too small to be initially viewed or the object initially appears around the edge of the screen. In addition, by using the distance detector 10 with a relatively low power consumption to detect whether the object is present at a predetermined distance and then triggering the identification module 11 and the zooming module 12 with a relatively higher power consumption if the object is present at the predetermined distance, the identification module 11 and the zooming module 12 can be deactivated and activated upon triggering, which can reduce a total power consumption of the optical system 1. In some embodiments, the distance detector 10 and the identification module 11 can be integrated into a single module (e.g., a high resolution radar module or two or more radar modules) to reduce a total area of the optical system 1. In some embodiments, the identification module 11 and the zooming module 12 can be integrated into a single module.

Figure 3:
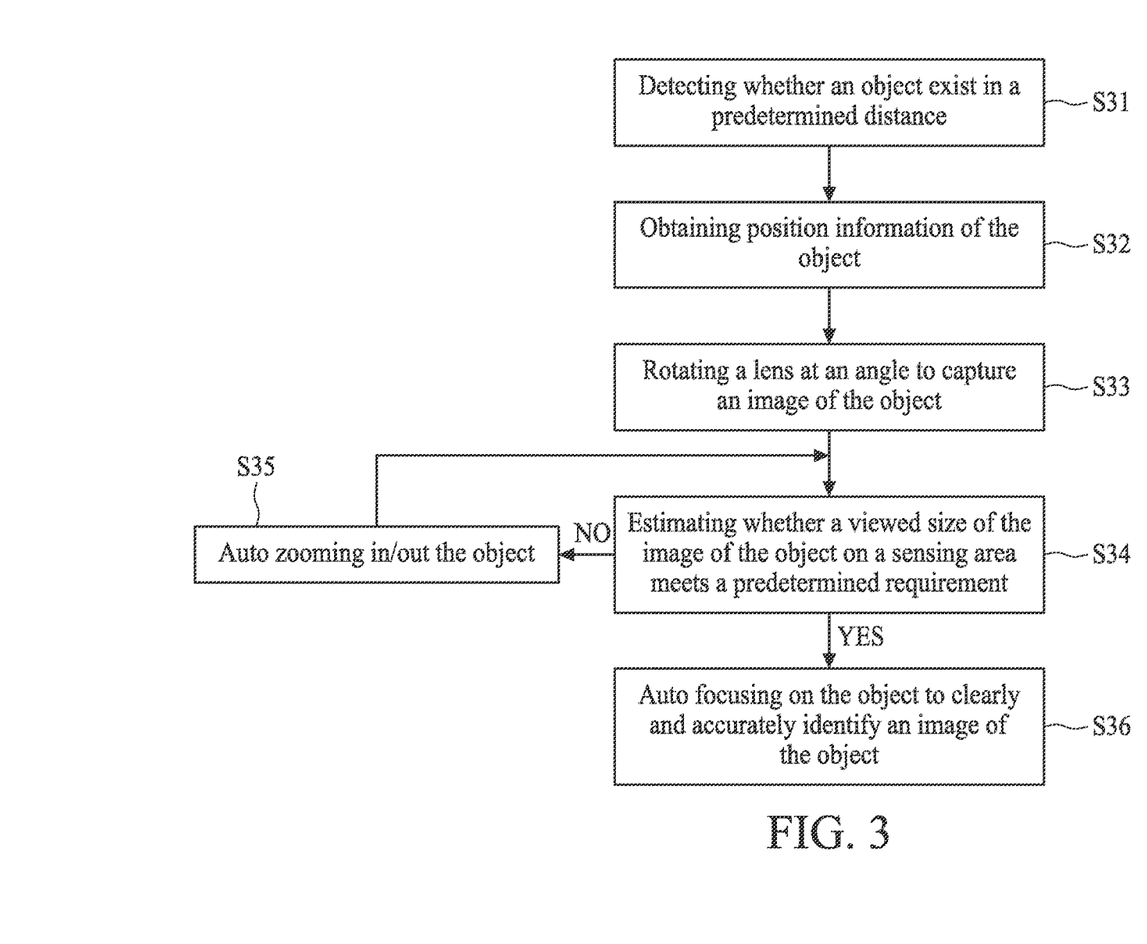
FIG. 3 illustrates a flow diagram of a method for operating an optical system in accordance with some embodiments of the present disclosure.

FIG. 3 illustrates a flow diagram showing a method for controlling an optical system in accordance with some embodiments of the present disclosure. In some embodiments, the flow diagram shown in FIG. 3 is used to control the optical system 1 as shown in FIG. 1. Alternatively, the flow diagram shown in FIG. 3 can be used to control other optical systems.

Referring to the operation S31, the method includes detecting whether an object is located at a predetermined distance or within a predetermined range of distances. If the object is located at a predetermined distance or within a predetermined range of distances, image information (such as position, distance, viewing angle and the like) of the object is then obtained as shown in the operation S32. If the object is not located at a predetermined distance or within a predetermined range of distances, the detection operation (the operation S31) will repeat. For example, as shown in FIG. 2, if an object (e.g., the object 15) located at the predetermined distance D is detected, image information of the object is then obtained. If an object (e.g., the object 15' or 15") is not located at the predetermined distance D, the operation of obtaining image information would not be triggered.

Figure 4A:
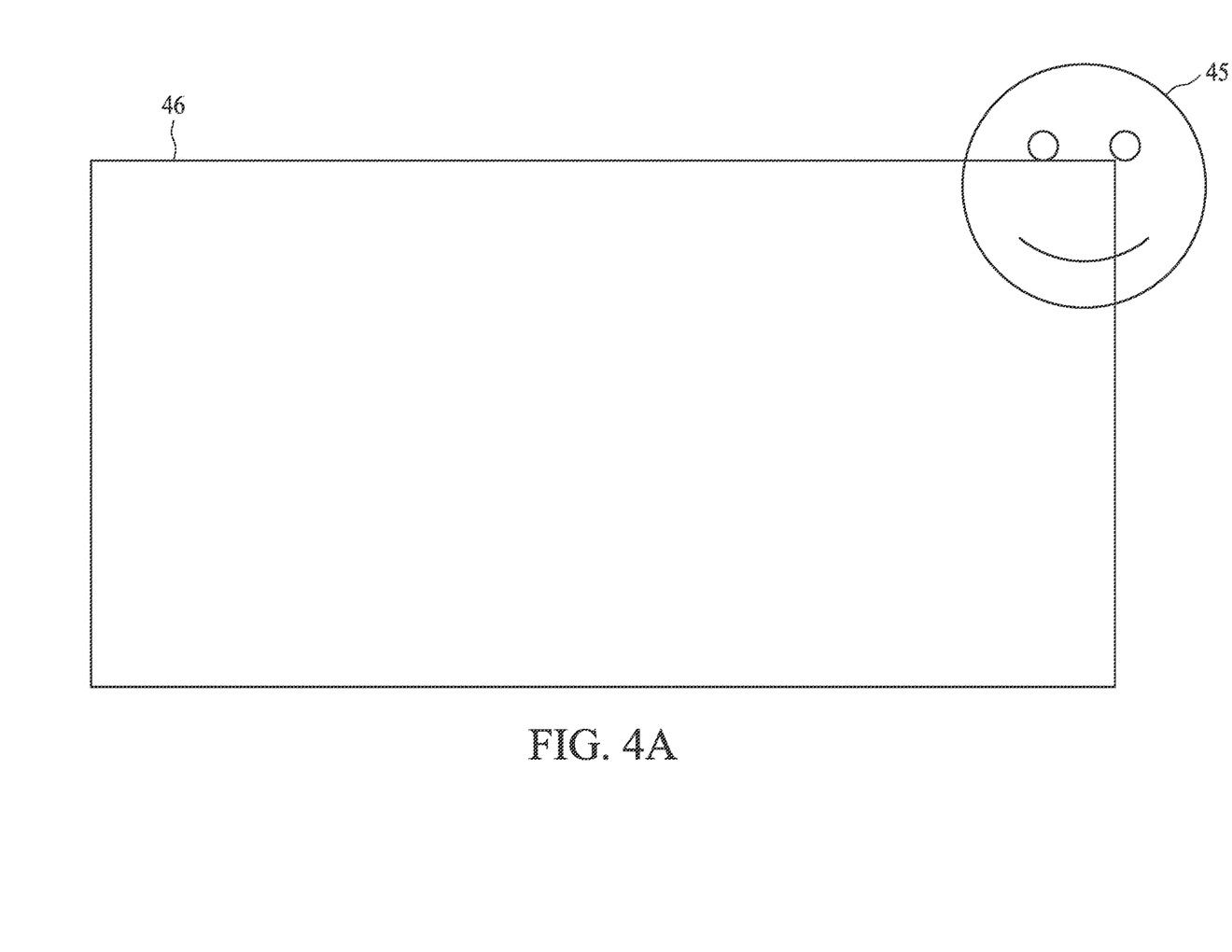
FIG. 4A, FIG. 4B and FIG. 4C illustrate a method for operating an optical system in accordance with some embodiments of the present disclosure.
Figure 4B:
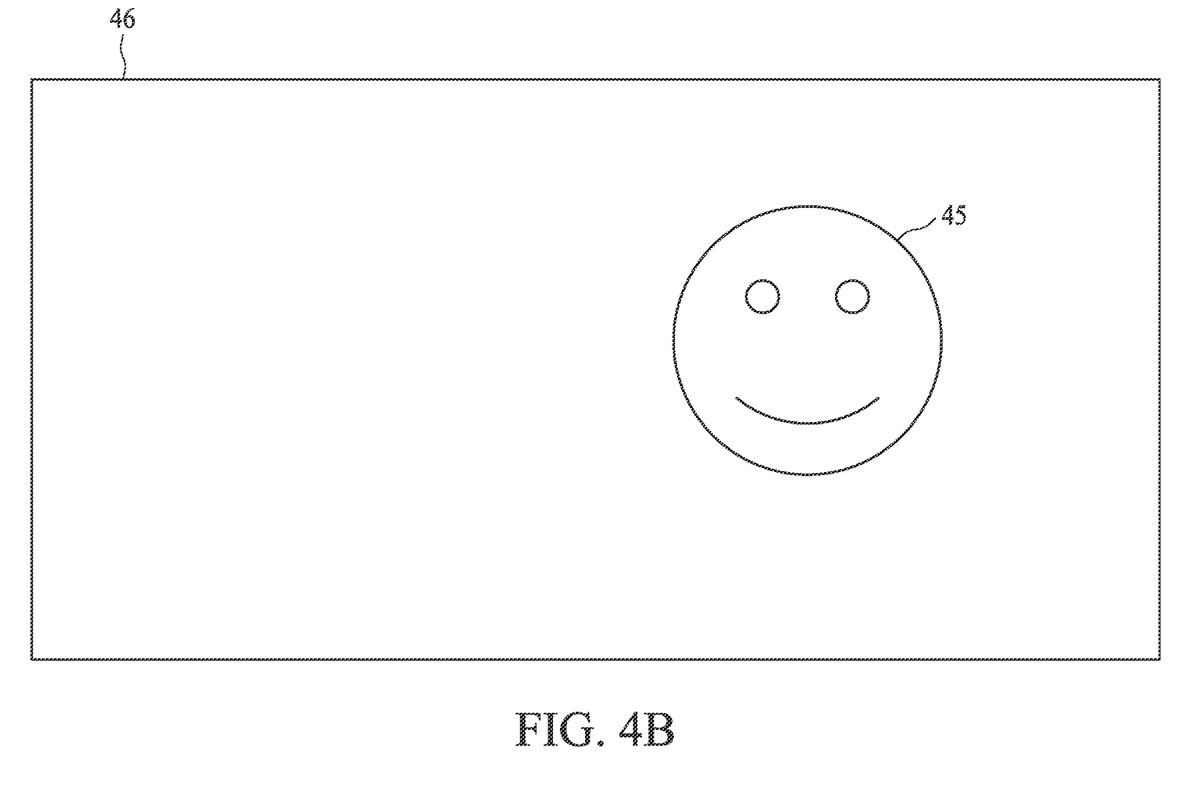

Referring to the operation S33, a lens or a camera of the optical system 1 is rotated at an angle to capture an image of the object based on the image information of the object obtained during the operation S32. In some embodiments, the rotating angle can be determined or calculated by the method shown in FIG. 2 and corresponding paragraphs. For example, as shown in FIG. 4A, before the lens is rotated, an image of an object 45 may not be completely viewable on a sensing area 46 or a screen (e.g., a portion of the image of the object 45 is outside the sensing area 46 or screen), while as shown in FIG. 4B, after the lens is rotated at the angle, the image of the object 45 can be fully viewable on the sensing area 46 or the screen.

Referring to the operation S34, the method includes estimating or determining whether a viewed size of the image of the object 45 on the sensing area 46 or the screen meets a predetermined criterion. For example, whether the proportion of the viewed size of the image of the object 45 on the sensing area 46 or the screen to the sensing area or the screen is equal to or greater than a predetermined value (such as about 30%, about 40%, about 50%, about 60% or another proportion) is estimated.

Figure 4C:
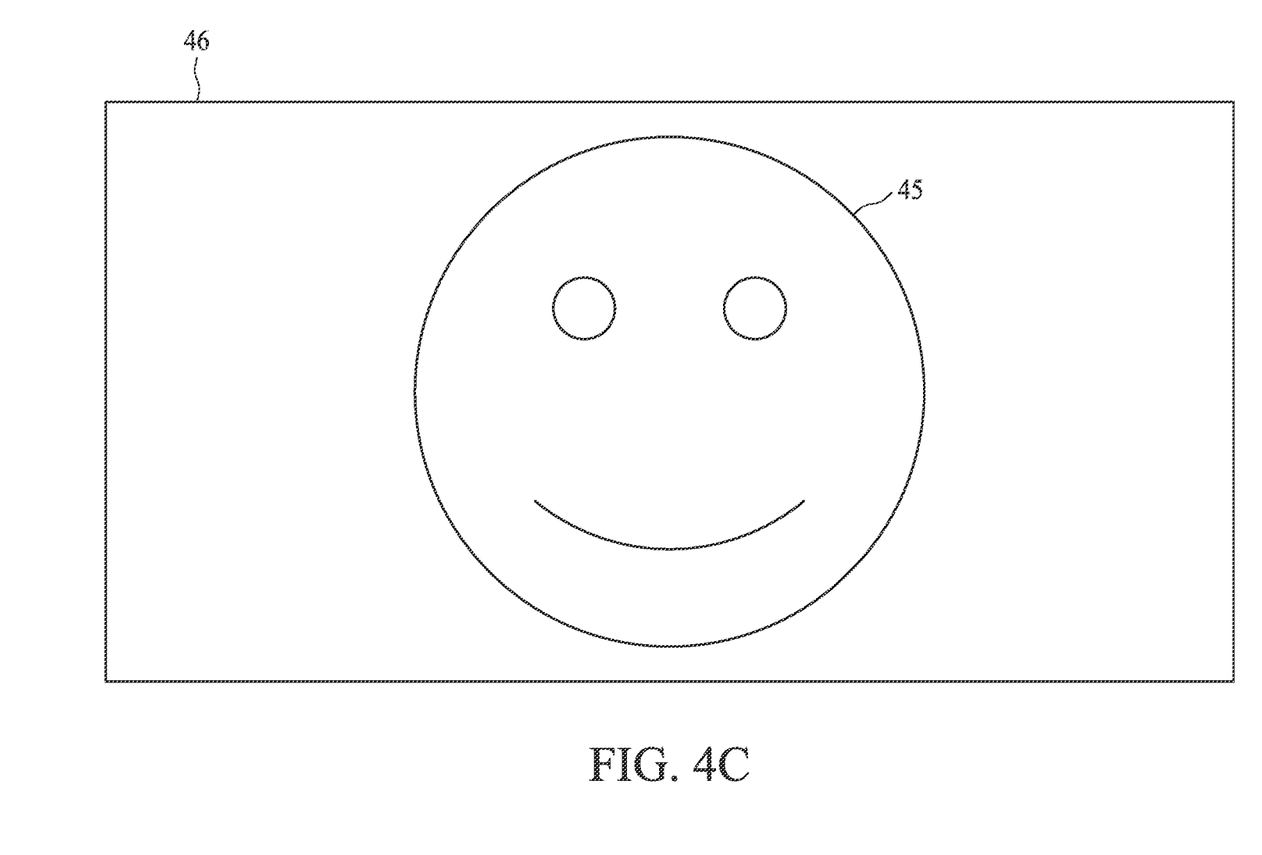

Referring to the operation S35, if the proportion of the viewed size of the image of the object 45 on the sensing area 46 or the screen to the sensing area or the screen is less than the predetermined value, the lens is configured to automatically zoom in the image of the object 45 to capture a magnified image as shown in FIG. 4C. If the viewed size of the image of the object 45 on the sensing area 46 or the screen does not reach the predetermined value, then the operations S34 and S35 are repeated until the viewed size of the image of the object 45 on the sensing area 46 or the screen reaches the predetermined value. In some embodiments, whether the viewed size of the image of the object 45 on the sensing area 46 or the screen reaches the predetermined value can be determined based on a number of pixels of the image of the object 45 on the sensing area. For example, the image of the object 45 can be captured according to an original focal length, the number of pixels of the object 45 can be obtained from the image, an adjusted focal length can be derived according to the original focal length and the number of pixels, and a magnified image of the object 45 can be captured according to the adjusted focal length.

Referring to the operation S36, after the viewed size of the image of the object 45 on the sensing area 46 or the screen reaches the predetermined value, an auto focusing operation is carried out to clearly and accurately identify the image of the object.

In some embodiments, the method shown in FIG. 3 can be used in a security system to identify whether a suspicious object or person is present at a predetermined distance or within a predetermined range of distances. In some embodiments, the method shown in FIG. 3 can be used in traffic to identify license plates or used in automatic driving systems.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" or "about" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the singular terms "a," "an," and "the" may include plural referents unless the context clearly dictates otherwise. In the description of some embodiments, a component provided "on" or "over" another component can encompass cases where the former component is directly on (e.g., in physical contact with) the latter component, as well as cases where one or more intervening components are located between the former component and the latter component.

Amounts, ratios, and other numerical values are sometimes presented herein in a range format. It can be understood that such range formats are used for convenience and brevity, and should be understood flexibly to include not only numerical values explicitly specified as limits of a range, but also all individual numerical values or sub-ranges encompassed within that range as if each numerical value and sub-range is explicitly specified.

Some embodiments of this disclosure relate to a non-transitory computer-readable storage medium having code or instructions thereon for performing various processor-implemented operations. The term "computer-readable storage medium" is used to include any medium that is capable of storing or encoding a sequence of instructions or code for performing the operations, methodologies, and techniques described herein. The media and code may be those specially designed and constructed for the purposes of the embodiments of the disclosure, or they may be of the kind available to those having skill in the computer software arts. Examples of computer-readable storage media include ROM; RAM; flash memory devices; discs such as internal hard drives, removable hard drives, magneto-optical discs, compact disc (CD), digital versatile disc (DVD), and Blu-ray discs; memory sticks; and the like. Examples of code include machine code, such as produced by a compiler, and files containing higher-level code that are executed by a processor using an interpreter or a compiler. For example, an embodiment of the disclosure may be implemented using Java, C++, or other object-oriented programming language and development tools. Additional examples of computer code include encrypted code and compressed code. Moreover, an embodiment of the disclosure may be downloaded as a computer program product, which may be transferred from a remote device to a requesting device via a transmission channel. Another embodiment of the disclosure may be implemented in hardwired circuitry in place of, or in combination with, processor-executable software instructions.

While the present disclosure has been described and illustrated with reference to specific embodiments thereof, these descriptions and illustrations do not limit the present disclosure. It can be clearly understood by those skilled in the art that various changes may be made, and equivalent elements may be substituted within the embodiments without departing from the true spirit and scope of the present disclosure as defined by the appended claims. The illustrations may not necessarily be drawn to scale. There may be distinctions between the artistic renditions in the present disclosure and the actual apparatus, due to variables in manufacturing processes and such. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it can be understood that these operations may be combined, sub-divided, or re-ordered to form an equivalent method without departing from the teachings of the present disclosure. Therefore, unless specifically indicated herein, the order and grouping of the operations are not limitations of the present disclosure.

What is claimed is:

1. A system, comprising:
a sensor module configured to detect an object at a predetermined distance and obtain position information of the object relative to the sensor module;
a zooming module configured to move at an angle and capture an image of the object; and
a controller connected to the sensor module and the zooming module, the controller configured to derive the angle in accordance with the predetermined distance and the position information of the object, the controller configured to control the zooming module to move in accordance with the angle,
wherein the controller is configured to derive the angle in accordance with a first distance between the object and a projection image of the sensor module at the predetermined distance, and a second distance between the sensor module and the zooming module.

2. The system of claim 1, wherein the sensor module comprises:
a distance detector configured to detect whether the object is at the predetermined distance and to transmit a signal if the object is at the predetermined distance; and
an identification module configured to be triggered by the signal to obtain the position information of the object.

3. The system of claim 2, wherein the first distance corresponds to a distance between the object and a central line of a projection image of the identification module at the predetermined distance, and the second distance corresponds to a distance between the central line of the identification module and a central line of the zooming module.

4. The system of claim 2, wherein the distance detector comprises a radar detector, a depth sensor or a sonar detector.

5. The system of claim 2, wherein the identification module comprises a dual camera module, a three-dimensional image sensing camera, or an image sensor and a lens.

6. The system of claim 2, wherein the controller is configured to derive the angle ($\varphi$) according to $$\varphi = \tan^{-1}\frac{x_1 + x_2}{D},$$

wherein $x_1$ is the first distance, $x_2$ is the second distance and D is the predetermined distance.

7. The system of claim 6, wherein the controller is configured to derive the first distance according to $$x_1 = D \times \tan\theta_1,$$

wherein $\theta_1$ is an angle specified by a central line of the identification module and a line connecting the object and the identification module.

8. The system of claim 1, wherein the zooming module comprises:
a zoom lens; and
a rotation mechanism connected to the zoom lens and configured to rotate the zoom lens at the angle.

9. The system of claim 1, wherein
the zooming module further comprises an image sensor comprising a sensing area and is configured to determine whether a viewed size of the object on the sensing area is less than a predetermined value, and to adjust the viewed size of the object if the viewed size is less than the predetermined value.

10. A system, comprising:
a distance detector configured to detect a presence of an object at a predetermined distance relative to the system and generate a signal responsive to detecting the presence the object;
an identification module configured to receive the signal and obtain a position of the object relative to the system; and
an zooming module comprising a lens, the zooming module configured to adjust a position of the lens according to the position of the object,
wherein the position of the lens is adjusted according to a first projection distance between the object and the identification module, and a second projection distance between the identification module and the zooming module.

11. The system of claim 10, wherein the distance detector comprises a radar detector, a depth sensor or a sonar detector.

12. The system of claim 10, wherein the identification module comprises a dual camera module or a three-dimensional sensing camera.

13. The system of claim 10, wherein the identification module is configured to capture an image of the object and to obtain the position of the object from the image of the object.

14. The system of claim 10, wherein the zooming module comprises a rotation mechanism connected to the lens and configured to rotate the lens at an angle $\varphi$, wherein $\varphi$ is derived according to $$\varphi = \tan^{-1}\frac{x_1 + x_2}{D},$$

wherein $x_1$ is the first projection distance between the object and the identification module, $x_2$ is the second projection distance between the identification module and the zooming module, and D is the predetermined distance.

15. The system of claim 14, wherein the first projection distance is derived according to $$x_1 = D \times \tan \theta_1,$$

wherein $\theta_1$ is an angle specified by a central line of the identification module and a line connecting the object and the identification module.

16. The system of claim 10, further comprising a controller configured to control the zooming module to adjust the position of the lens according to the position of the object.

17. A method of controlling an image-viewing system comprising a lens, the method comprising:
  (a) detecting that an object is located at a predetermined distance;
  (b) obtaining information corresponding to a position of the object responsive to detecting the object;
  (c) determining an angle according to the position of the object and the predetermined distance;
  (d) rotating the lens at the angle to capture an image of the object according to an original focal length;
  (e) obtaining a number of pixels of the object from the image;
  (f) deriving an adjusted focal length according to the original focal length and the number of pixels; and
  (g) obtaining a viewed size of the object from the image.

18. The method of claim 17, further comprising:
  comparing the viewed size of the object with a predetermined value; and
  zooming in on the object to obtained a magnified image of the object if the viewed size of the object is less than the predetermined value.

* * * * *